INVENTOR.
GEORGE E. MEDAWAR
FELIX HOM

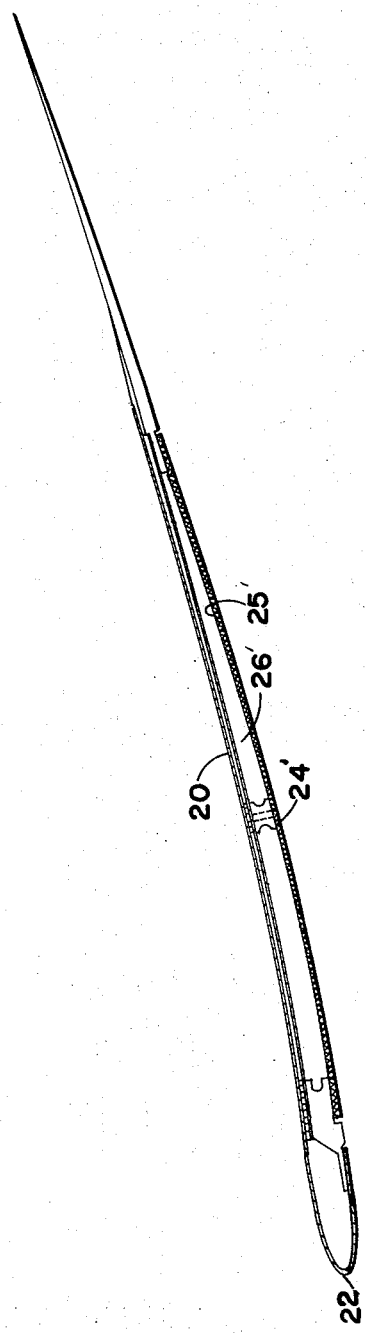
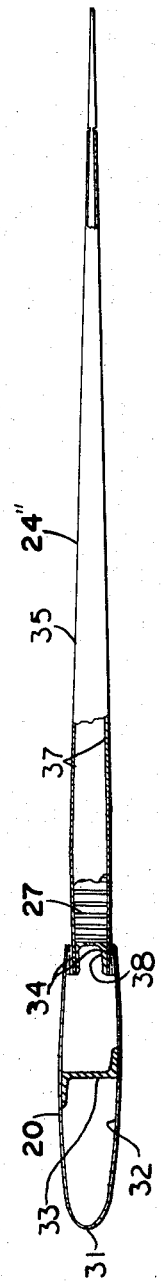

United States Patent Office 3,702,220
Patented Nov. 7, 1972

3,702,220
NOISE REDUCTION IN JET ENGINES HAVING FANS OR LOW PRESSURE COMPRESSORS
George E. Medawar, San Diego, and Felix Hom, La Mesa, Calif., assignors to Rohr Industries, Inc.
Filed Nov. 12, 1970, Ser. No. 88,541
Int. Cl. E04b 1/99; F01d 29/00; F02k 3/00
U.S. Cl. 415—119
16 Claims

ABSTRACT OF THE DISCLOSURE

A turbofan jet engine employed in the propulsion of aircraft. The air inlet to a typical fan-jet engine is defined by the cowl and cowl lip ring which directs the incoming air to and through the fan, or low pressure compressor, having rotor and stator blades. The primary flow is directed into the combustion chamber where hot gases resulting from combustion are used to drive the fan or low pressure compressor. The secondary outer portion of the air pressurized by the fan is directed rearward around the outer edge of the inner engine defined by the inner cowl and the outer wall adjacent the combustion chamber and directed to provide a propulsive force from the engine. At least two annular splitter rings concentrically spaced are provided within the cowl forward of the fan or low pressure compressor.

The surfaces of the splitter rings as well as the inner cowl wall and the passages directing the secondary air from the fan rearward are provided with sound absorptive material thereon. The splitter rings, resonance cavities, and sound absorptive material effectively reduced the forward and rearward propagation of noise, generated by the fan, or low pressure compressor.

BACKGROUND OF THE INVENTION

This invention relates to aircraft propelled by jet engines containing a fan, or low pressure compressor, and more particularly to improvements in the reduction of the noise produced by such engines.

It is well known that objectional noise is produced by the fan, or low pressure compressor, of this type of jet engine. This high pitch whinning noise is propagated forward of the aircraft as well as rearward. In accordance with this invention the noise propagation from the fan, or low pressure compressor, passes over areas provided with sound absorptive surfaces. The sound suppression means provided by this invention present no adverse effects to normal engine performance.

SUMMARY OF THE INVENTION

More particularly, in a preferred form of this invention, the internal surface areas of the intake end of a fan jet engine have been increased by the addition of so-called "splitter rings" or "air divider" rings positioned coaxially within the intake duct and upstream of the fan blades. This additional area as well as the inner cowl surface of the intake throat of the engine and the passage provided for rearward flow of compressed air exiting the rear of the fan are provided with sound absorptive material.

Accordingly, one object of the present invention is to minimize the forward and rearward propagation of sound from a jet engine having a fan, or low pressure compressor.

Another object is to provide required structure and design to satisfy this sound suppression object of the invention while minimizing adverse effects on the normal operating characteristics of the engine employing the invention.

Still other objects, features and advantages of the present invention will become more fully apparent as the description proceeds, reference being had to the accompanying drawings wherein:

BRIEF DESCRIPTION OF THE DRAWINGS

FIG. 3 shows a section taken along line 3—3 of drawing FIG. 2.

FIG. 4 shows a section taken along line 4—4 of drawing FIG. 2.

DETAILED DESCRIPTION

Figure 1:
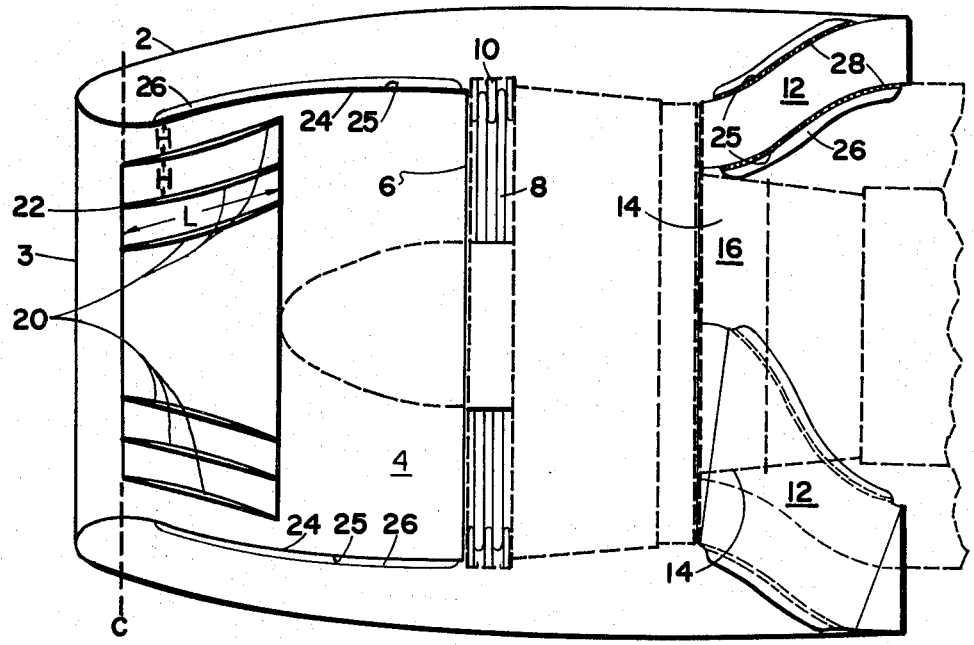
FIG. 1 is the forward longitudinal cross section of a typical jet engine containing a fan or low pressure compressor and showing the location and spaced relationship of the splitter rings and the location of resonance cavities and accompanying absorptive material surfaces.
Figure 2:
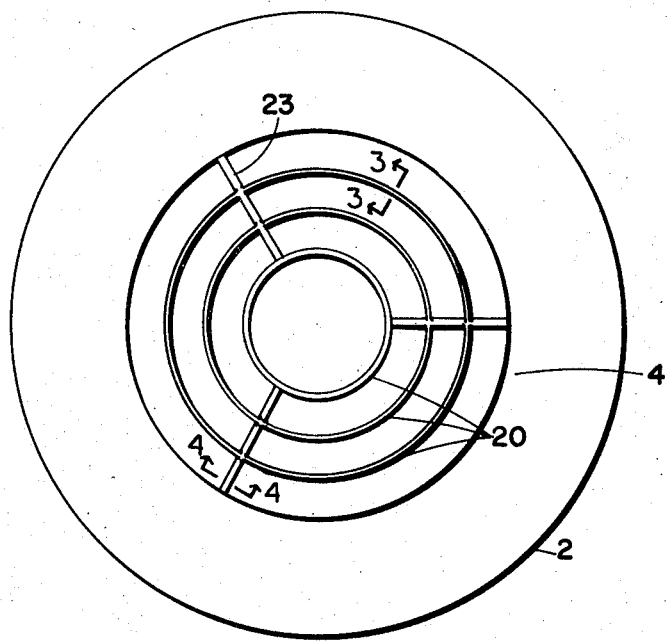
FIG. 2 is a front end view looking into the inlet of the same engine.

FIG. 1 illustrates the forward portion of a jet engine including an outer cowl 2 defining the outermost bounds of the flow path of incoming air entering the engine inlet 4. The incoming air is pressurized by a fan, or low pressure compressor 6. The outer portion of the pressurized air is exited rearwardly as secondary air through passage 12 formed by cowl 2 and a wall adjacent to the engine combustion chamber 16. The primary inner portion of the pressurized air exiting the fan, or low pressure compressor 6 enters inlet 14 to the combustion chamber 16 where gases of combustion provide means for driving the fan, or low pressure compressor 6.

The fan, or low pressure compressor 6, is comprised of rotor blades 8 and stator blades 10 and the rotor blades 8 being driven by the gases of combustion.

Multiple annular splitter rings 20 having air foil longitudinal configuration shown in FIG. 1 and FIG. 3 all having a similar air foil design are mounted concentrically spaced within the inlet portion 4 of the cowl 2. The mounting means 23 can be of any suitable means, an example being that disclosed in copending application Ser. No. 861,849 by Edward M. Sankey filed Sept. 29, 1969, now Pat. No. 3,568,790, assigned to the same assignee as in the instant case.

Preferably the leading edges 22 of the splitter rings 20 are adjacent to the same transverse plane C and spaced downstream of lip ring 3 and upstream of throat inlet with their aft edges co-terminous with the forward edge of the engine nose bullet as shown in FIG. 1. The trailing edges of the splitter rings 20 are spaced adjacent to the fan, or low pressure compressor 6 and thus are disposed longitudinally intermediate the upstream end 3 of cowl 2 and the blades 8 of compressor 6.

The surface 24 of cowl 2 is formed of sound absorptive material such as employed for the splitter ring surfaces 24', this being acoustic sandwich panel structure, or alternatively, the reference character 25, for example, designating felt metal closing resonance cavities 26.

The splitter rings 20 of the invention have sound absorptive surfaces 24' shown in FIG. 3. Surfaces 24' may comprise layers of honeycomb core material in back-to-back relation on opposite sides of a common intermediate or backing sheet and a pair of perforated face sheets spaced from the backing sheet by the layers of core material to provide resonant cavities between the face sheets and the backing sheet, substantially as disclosed and described in the aforementioned patent application of Edward M. Sankey, and the disclosure of that application is incorporated herein by reference thereto. Alternatively surfaces 24' may comprise felt metal 25 as shown in FIG. 3. Resonance cavities 26, as shown in FIG. 3, have openings covered with a sheet or sheets 25 of felt metal such as FM 30 felt metal supplied by Huyck Metals Company. Honeycomb having resonant cells is also disclosed in copending application Ser. No. 832,948 of Dale W. R.

Lawson for Retractable Vane Type Inlet Noise Suppressor, filed on June 13, 1969, and copending application Ser. No. 874,904 of James R. Woodward et al. for Sound Absorptive Honeycomb Sandwich Panel with Multi-Layer, Porous, Structural Facing, filed Nov. 7, 1969, both applications having the same assignee as the present application.

The positioning of the splitter rings 20 with respect to one another is important in order to take the most optimum advantage of their sound suppressing surface areas. The longitudinal dimension L of the splitter rings should be several times the radial dimension H which is shown in FIG. 1 to be the radial distance between the opposing sound absorptive surfaces 24' of adjacent rings 20 and also the radial distance between the opposing sound absorptive surfaces 24 and 24' of the cowl and of the adjacent ring 20, respectively.

Referring now to FIG. 4, the radial supports 23 for splitter rings 20 may be constructed as shown in FIG. 4 wherein it may be seen that the support is generally airfoil shape in cross section. The leading edge 31 of support 23 is formed by a double back metal sheet 32 reinforced by an inverted Z member 33. The open ends of sheet 32 are suitably secured at 34, as by brazing, to a honeycomb sandwich panel 35 which forms the wedge-shaped trailing portion of the support 23. Panel 35 comprises a honeycomb core 27, facing sheets 37, and a reinforcing U member 38. It will be understood that the surfaces 24'' of each radial support member 23, when desired, may be acoustically treated generally in the same manner as the ring and cowl surfaces 24' and 24, respectively.

Surface 28 of the aft cowl passage 12 for the secondary rearward flowing air pressurized by the fan, or low pressure compressor 6 contains resonance cavities 26 having their openings covered by a suitable acoustic member 25 such as the aforedescribed felt metal, or alternatively, by acoustic honey comb sandwich panel structure as hereinbefore described by reference to the aforementioned copending applications.

This invention provides a novel and unobvious means for reducing the noise produced by the fan, or low pressure compressor, of a conventional fan jet or the like engine used to propel modern aircraft without effecting the normal operation of the engine.

This invention may be embodied in other forms or carried out in other ways without departing from the spirit or essential characteristics thereof. The present embodiments and examples of the invention are therefore to be considered as in all respects illustrative and not restrictive, the scope of the invention being indicated by the appended claims, and all changes which come within the meaning and range of equivalence of the claims are intended to be embraced therein.

Having thus described the invention, what is claimed as new and useful and desired to be secured by U.S. Letters Patent is:

1. In an engine, employed for the propulsion of an aircraft which includes a nose bullet and a compressor having a bladed rotor,
    a cowl having a forward inlet lip for defining the flow path of air to and through the compressor,
    an annuar splitter disposed generally concentrically within said cowl and positional with its leading edge aft of said inlet lip and its aft edge coterminous with the forward edge of said nose bullet,
    sound absorbing panels mounted on the surface of said cowl and splitter.

2. The combination of claim 1 wherein the splitter is of air foil longitudinal section.

3. The combination of claim 1 wherein the length of said splitter is several times the radial distance between said splitter and cowl.

4. The combination of claim 1 wherein the inner surface of the splitter is also lined with sound absorbing panels.

5. The combination of claim 4 wherein said sound absorbing panels are comprised of resonant cavities having openings covered with felt metal.

6. The combination of claim 4 wherein said sound absorbing panels are comprised of honeycomb panels with resonant cells and perforated facing sheets.

7. The combination of claim 1 wherein multiple annular concentrically spaced splitters are provided.

8. The combination of claim 7 wherein the surfaces of all annular splitters are lined with sound absorbing panels.

9. The combination of claim 8 wherein the sound absorbing panels are comprised of resonant cavities having openings covered with felt metal.

10. The combination of claim 8 wherein said sound absorbing panels are comprised of honeycomb panels with resonant cells and perforated facing sheets.

11. The combination of claim 1 wherein the engine has a fan or low pressure compressor for producing a pressurized air stream,
    an annular passage for discharging said pressurized air stream rearwardly therethrough,
    said passage having surfaces lined with sound absorbing panels.

12. The combination of claim 11 wherein said sound absorbing panels are comprised of resonant cavities having openings covered with felt metal.

13. The combination of claim 11 wherein said sound absorbing panels are comprised of honeycomb panels with resonant cells and perforated facing sheets.

14. In an engine, employed for the propulsion of an aircraft, which includes a nose bullet and a compressor having a bladed rotor,
    a cowl having a forward inlet lip for defining the flow path of air to and through the compressor,
    at least one annular splitter of curved airfoil longitudinal section disposed generally concentrically within said cowl with its convex surface nearest the engine center line with the leading edge aft of said inlet lip and its aft edge coterminous with the forward edge of said bullet and the aft edge angled away from said bullet so as to prevent a line of sight from said inlet lip to said compressor blades,
    sound absorbing materials on the surfaces of said cowl and splitter,
    and radial support members for supporting said splitter on the cowl in spaced relationship therewith.

15. The combination of claim 14 wherein each said supporting member is airfoil shaped in cross section and has sound absorptive surfaces.

16. The combination of claim 1 wherein said annular splitter has a curved longitudinal configuration with its convex surface nearest the engine center line and the aft edge is angled away from said bullet so as to prevent a line of sight from said inlet lip to said compressor blades.

References Cited
UNITED STATES PATENTS

| | | | |
|---|---|---|---|
| 3,618,700 | 6/1970 | Bond | 415—119 |
| 3,113,634 | 12/1963 | Watters | 415—119 |
| 3,439,774 | 4/1969 | Callaway et al. | 181—71 |
| 3,477,231 | 11/1969 | Paulson | 60—269 |
| 3,481,427 | 12/1969 | Dobbs et al. | 181—33 HA |
| 3,542,152 | 11/1970 | Adamson | 415—119 |
| 3,568,790 | 3/1971 | Sankey | 137—15.1 |

HENRY F. RADUAZO, Primary Examiner

U.S. Cl. X.R.

181—33 HA; 137—15.1; 60—269